A. G. FEHRING.
GRAIN SEPARATOR.
APPLICATION FILED FEB. 2, 1920.

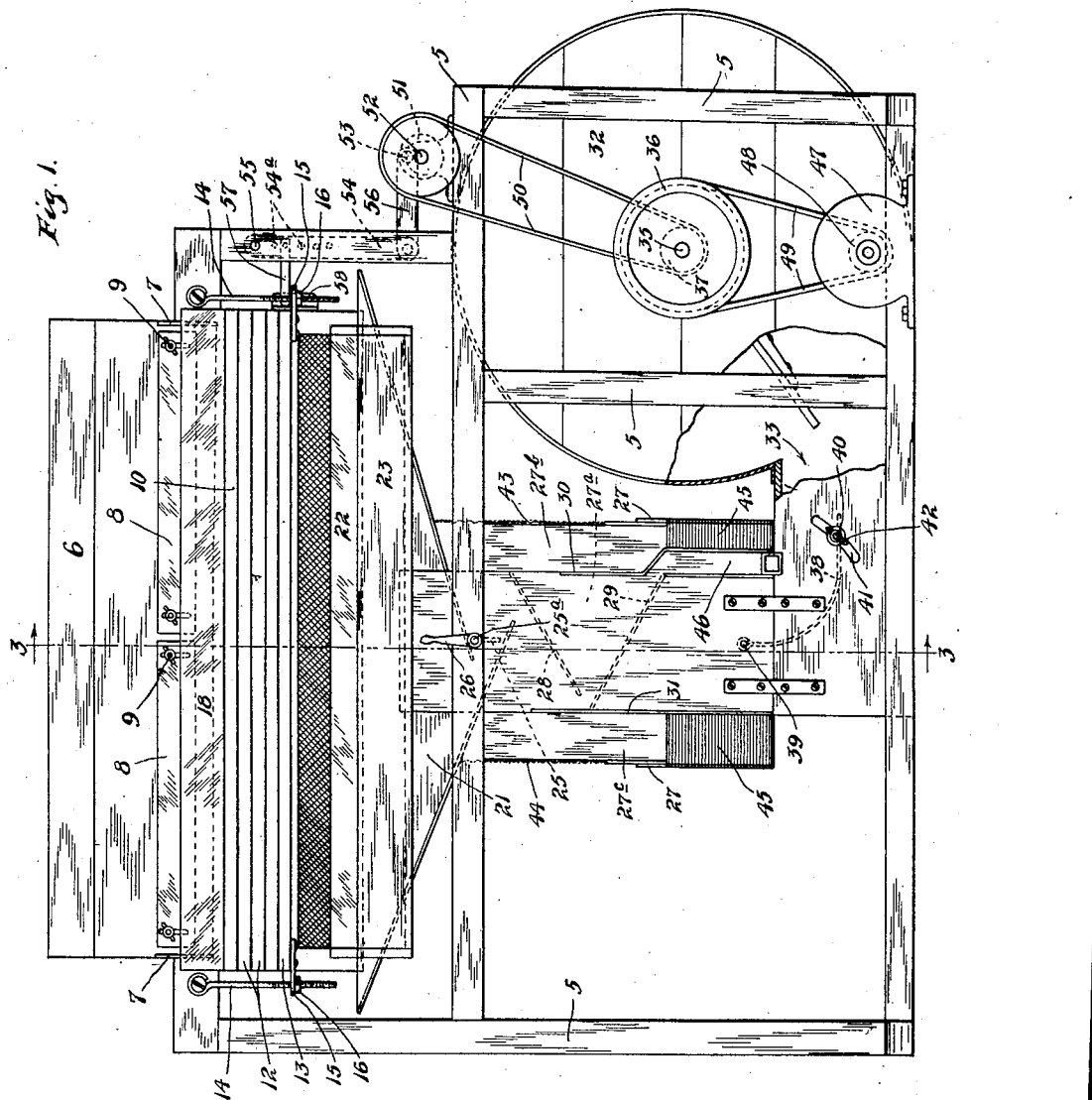

1,393,993.

Patented Oct. 18, 1921.
3 SHEETS—SHEET 2.

INVENTOR.
A. G. FEHRING.
BY HIS ATTORNEYS.

A. G. FEHRING.
GRAIN SEPARATOR.
APPLICATION FILED FEB. 2, 1920.
1,393,993.
Patented Oct. 18, 1921.
3 SHEETS—SHEET 3.
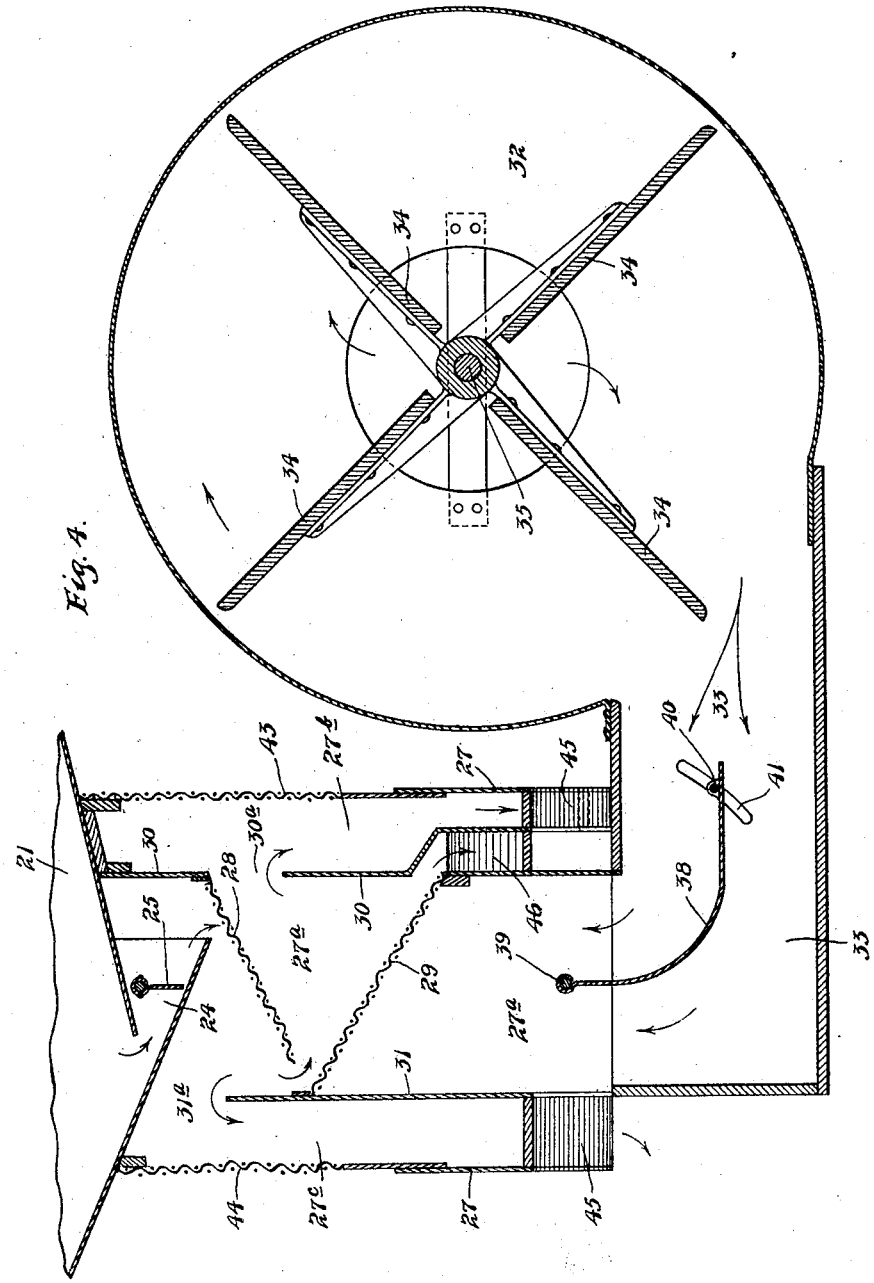
INVENTOR.
A. G. FEHRING,
BY HIS ATTORNEYS.

UNITED STATES PATENT OFFICE.

ADOLPH G. FEHRING, OF MINNEAPOLIS, MINNESOTA.

GRAIN-SEPARATOR.

1,393,993.　　　　　Specification of Letters Patent.　　Patented Oct. 18, 1921.

Application filed February 2, 1920. Serial No. 355,608.

*To all whom it may concern:*

Be it known that I, ADOLPH G. FEHRING, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My invention relates to separators of the type usually designated as fanning mills, and while capable of more general use, was particularly designed, and is especially adapted for the separation of wheat and oats and various other commingled seeds and materials, which mixtures are frequently designated as "succotash."

Generally stated, the invention consists of the novel devices and combinations of devices hereinafter described and defined in the claims.

In this improved separator, the separation is accomplished, partly by the use of sieves and partly by the use of a fan blast and coöperating deflectors.

The preferred form of the improved separator is illustrated in the accompanying drawings wherein like characters indicate like parts.

Referring to the drawings:

Figure 1 shows the separator in rear elevation, some parts being broken away and some parts being sectioned;

Fig. 4 is a vertical section on the line 4—4 of Fig. 2.

Figure 3:
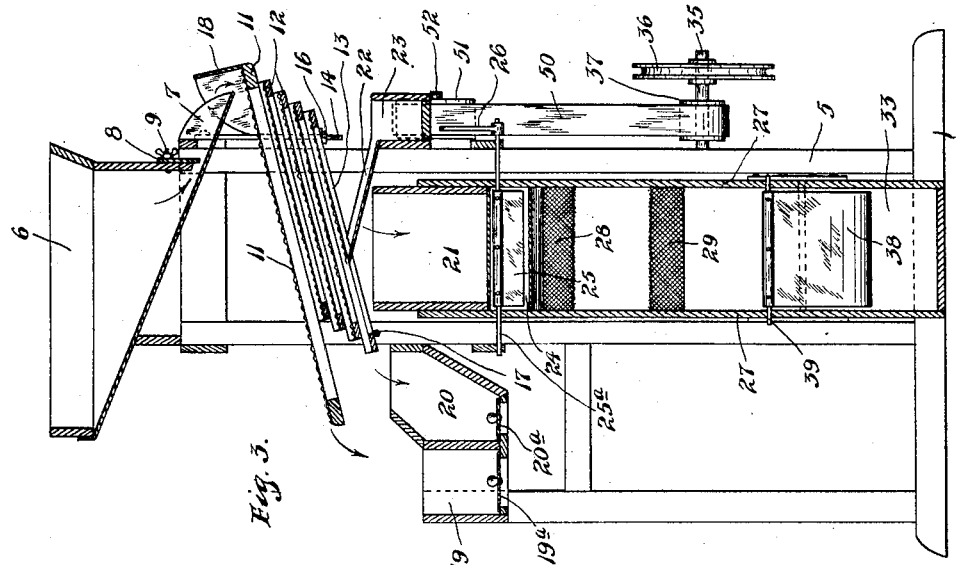
Fig. 3 is a section taken from front to rear of the machine on the line 3—3 of Fig. 1.
Figure 2:
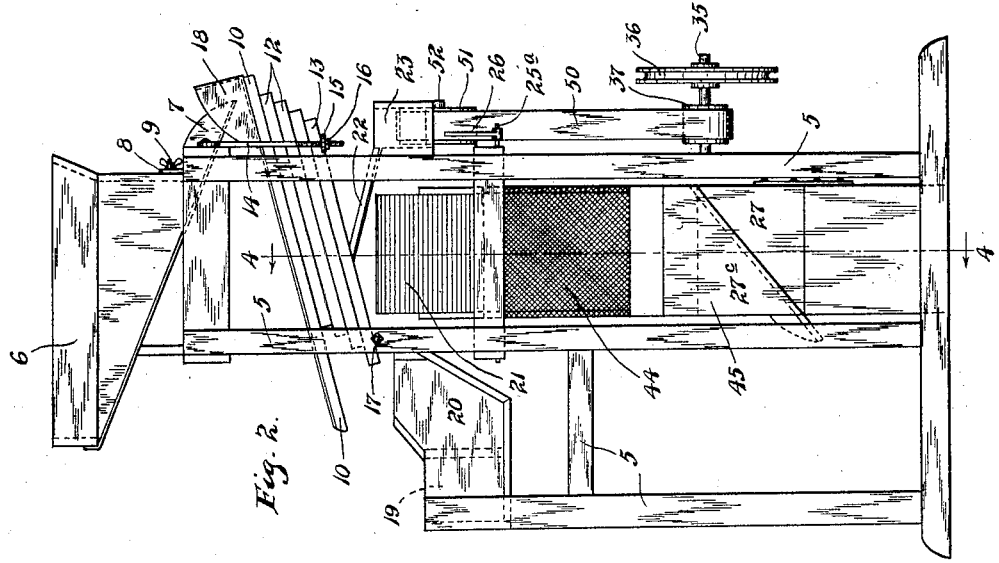
Fig. 2 shows the separator in side elevation as viewed from the left of Fig. 1.

The various parts of the separator are supported by suitable framework 5. This framework 5, at its top, supports a receiving hopper 6 provided with a discharge spout 7, the throat of which is controlled by an adjustable gate 8. As shown, the gate 8 is made up of two sections, the sections thereof being adjustably secured to the hopper by bolt and slot connections 9, so that the flow of the grain mixture or succotash from the hopper may be properly regulated.

Working below the hopper is a vibratory sieve-equipped shoe made up of a plurality of connected rectangular frames 10 that carry a top scalping screen 11, intermediate gang sieves 12, and a lower fine mesh sieve 13. The screen shoe is hung at its rear with freedom for vibrations transversely of the machine, on hanger rods or links 14 pivotally connected at their upper ends to the top of the frame 5 and adjustably connected at their lower ends to clips 15 on the said shoe by nuts 16 that engage threaded ends of said hanger rods (see particularly Fig. 1). The shoe, at its front end, rests loosely on a transverse guide rod 17 supported by the frame 5. By adjustments of the nut 16, inclination of all of the sieves, 11, 12 and 13 may be varied. At its upper receiving end, the scalping screen 11 has a hood flange 18 that insures the delivery of all of the grain onto the said scalping screen. Said scalping screen 11 is longer than the underlying sieves, but the lower fine meshed sieve 13 is much shorter than the intermediate sieves 12. The scalping screen 11 delivers into a box 19, while material, such as oats, that are delivered over the sieves 12, will be discharged into a box 20. The good wheat that passes through the sieves 12 will be caught by a hopper 21, while the fine seeds and material that pass through the sieve 13 will be delivered onto a chute 22, and from thence, into a catch box 23. (See particularly Fig. 3.) The boxes 19 and 20, the hopper 21, chute 22 and box 23 are all suitably supported from the framework 5.

The hopper 21, in its bottom, has a discharge throat 24 in which is an adjustable gate 25, the pivot shaft $25^a$ of which projects and is provided with an operating lever 26, by means of which, said gate may be set in different positions.

The hopper throat 24 delivers into the upper portion of the central chamber $27^a$ of an upright housing 27, said housing, on opposite sides of the chamber $27^a$ having outer chambers $27^b$ and $27^c$. The stock is delivered from the throat 24 directly onto the inclined plate 28, and from thence, onto an inclined plate 29. The plates 28 and 29 are perforate, or of a screen material of such fine mesh that the air will pass therethrough, but the grain will not. The upper plate 28 extends from the vertical plate 30 but terminates short of a vertical plate 31, while the perforate plate 29 extends from plate 31 to the lower portion of the plate 30. The plates 30 and 31 are secured within or to the housing 27. The plate 31 terminates below the bottom of the hopper so as to leave an air passage 31ª, while the plate 30, just below the inclined plate 28, is formed with a large air passage 30ª. The numeral 32 indicates a fan casing secured to the lower portion of the frame 9 and provided with a discharge spout 33 that opens into the bottom of the central chamber 27ª. Working within the fan casing 32 is a fan head 34, the shaft 35 of which projects, and at one end is provided with pulleys 36 and 37. The numeral 38 indicates a curved air deflecting plate, which, as shown, is pivoted at its upper end on a rod 39 located in the central lower portion of the chamber 27ª and suitably supported by the housing 27. The free lower end of this air deflecting plate 38 is made adjustable, as shown, by means of a rod 40 attached thereto and working in a segmental slot 41 in one side of the fan discharge spout 33. The said rod, 40, at its outer end, has a thumb nut 42 for securing it in the desired adjustment.

The outer wall of the chamber 27ᵇ of housing 27 has a fine mesh screen panel 43, and the outer wall of the chamber 27ᶜ has a similar fine mesh screen panel 44. The chambers 27ᵇ and 27ᶜ, at their lower extremities, have inclined bottoms 45 that may be provided with any suitable discharge gates or openings. The inclined perforate plate 29 delivers into a hopper-like receptacle 46 with a suitable discharge spout opening. The catch boxes 19 and 20 are shown as provided with sliding discharge gates 19ª and 20ª, respectively, in their bottoms. (See Fig. 3.)

The numeral 47 indicates an electric motor, the shaft of which has a pulley 48 over which, and the pulley 36, runs a belt 49. The numeral 50 indicates a belt that runs over the pulley 37 on a shaft 35 and over a pulley 51 on a short shaft 52 that is journaled in a suitable bearing on the frame 5 and carries a crank 53. The numeral 54 indicates a lever pivoted at its upper end to the frame 5 at 55 and connected at its lower end by a link or rod 56 to the crank 53. The lever 54 is provided with a plurality of vertically spaced holes 54ª, any one of which is adapted to be pivotally connected to a rod or link 57, the extended end of which is pivotally connected to a bracket 58 on the sieve shoe or frame 10.

When the motor 47 is in action, the sieve shoe 10 will be vibrated transversely and the fan head 34 will be rotated in the direction of the arrows indicated in Fig. 4. The blast of air from the fan will be blown upward through the perforated plate 29 and will be divided, part of the same turning to the right in respect to Fig. 4 and passing out through the air passage 30ª and screen panel 43, and the other part thereof, passing to the left through the air passage 31ª and out through the screen panel 44. The stream of mixed grain, seeds, and the like, passing from the hopper downward, will be subjected to this blast with a result that will presently be noted, after first having described the preliminary separations accomplished by the vibratory screens or sieves.

The succotash or commingled wheat, oats, seeds, chaff, straw, and the like, will be delivered from the upper hopper 6 directly onto the receiving end of the scalping screen 11 and all but the straw or coarse material will pass through this screen onto the upper sieve 12, but the straw and coarse material will be delivered off from the lower end of the screen 11 and into the box or receptacle 19. The wheat, and, in fact, all of the stock delivered onto the upper sieve 12, except the good oats, will pass successively through the sieves 12, while the good oats will be passed off from the lower ends of the sieves 12 and into the box or receptacle 20. Hence, it follows that all of the good wheat, shriveled or broken wheat, dust, small chaff, pin oats, king heads, chess, mustard seed, or the like, will pass through the sieves 12 and onto the lower fine mesh sieve 13. The finest of these particles, such as dirt and small seeds, will pass through the sieve 13 and into box or receptacle 23, but the rest of the materials, including the good wheat, will pass on into lower hopper 21, and from thence, will be delivered to the air blast, as noted in the earlier part of this description. The good wheat, being relatively heavy, will pass through the air blast, traveling first over the inclined plate 28 and then over the perforate inclined plate 29 and into the spout or hopper-like bottom 46, but all of the other materials, including more or less light dust, small chaff, pin oats, and shriveled or broken wheat, will be taken up by the air blast and carried through the air passages 30ª and 31ª and into the outer chambers 27ᵇ and 27ᶜ, and thence into the hopper discharge spouts or bottoms 45. The lighter of the said rejected particles separated from the wheat, will be carried out through the air passage 31ª, but those that are a little heavier and are subjected to the stronger blast at a point lower down will be carried out through the air passage 30ª. Thus, the complete separation of all of the originally commingled materials from the good wheat is effectually accomplished, and moreover, the good oats are separated from the other rejected materials and the rejected materials, including certain seeds, shriveled or broken wheat, pin oats, and the like, are separated from straw, dust or dirt and saved for use, such as chicken feed.

The division of the blast from the fan may, by adjustments of the deflecting plate 38, be properly regulated and directed in its tendency to blow with greater or less intensity, outward through the air passages 30ª and 31ª. The efficiency of this machine has been demonstrated in practice, and the statements of operation above made are based on the actual operation of the machine in practice.

What I claim is:

1. In a grain separator, the combination with a housing forming a chamber, of an inclined perforate member extending entirely across said chamber, a second oppositely inclined perforate member above said first member extending adjacent to the upper end of first mentioned member, a hopper at the top of the chamber having a bottom oppositely inclined to the second perforate member and terminating near the upper end thereof, said housing having an opening at one side thereof below the upper side of said hopper bottom and an opening at the other side below said second perforate member, whereby are formed converging unobstructed spaces above each perforate member each of which communicates with an opening in the housing.

2. A housing having a perforate wall on opposite sides thereof adjacent the upper end, partitions near each side thereof, forming discharge receptacles, an inclined screen connecting said partitions, a second oppositely inclined screen above the first mentioned screen extending adjacent to its upper end, an imperforate member above said second screen oppositely inclined thereto and extending adjacent its upper end, means for forcing air into said housing, said partitions having openings above said screens, whereby the air can pass directly through said screens to said openings and pass out through the perforate sections of the housing.

3. In an air separator, a casing, two superimposed oppositely inclined screens therein, said casing having an opening at one side thereof below the upper screen and an opening at the other side thereof, a housing adjacent the sides of said casing and forming therewith discharge receptacles at each side thereof, perforate sections in said housing, and means for forcing air into the bottom of said casing, through said screens, and out the perforate sections of said housing.

4. A separator comprising a casing forming a chamber, perforate oppositely inclined baffles therein the lower one of which extends entirely across said chamber, openings above said baffles, a housing adjacent the outer sides of said casing, perforate sections in said housing, at each side of said casing, and means for forcing air into the lower part of the chamber, through said screens and out at the perforate sections of said housing whereby the light material will be carried into said housing.

5. A separator comprising a casing forming a chamber, perforate oppositely inclined baffles therein, the lower one of which extends entirely across said chamber, openings above said baffles, a housing adjacent the outer sides of said casing, perforate sections in said housing, a horizontal passage communicating with the lower end of said chamber, an air directing member pivoted at the lower part of the chamber and curved to extend into the horizontal passage, means for forcing air into said passage, and means for varying the position of said directing plate, whereby the amounts of air directed against the upper and lower part of the lower baffle may be varied.

6. In a grain separator, a casing forming a chamber, a series of chambers therein having their upper ends converging and having perforate bottoms, and an opening at their upper portions, receptacles with which said openings communicate, said receptacles having perforate sections, means for forcing air successively through said chambers and receptacles, and out said perforate sections, the chambers of said series being entirely unobstructed 7. A grain separator comprising a housing forming a chamber, said chamber being divided into a central portion and smaller lateral portions by vertical partitions, a receptacle formed at the bottom of each portion, a series of oppositely inclined screens in the central portion, the outer walls of the housing having perforate sections, there being openings in the vertical partitions affording communication between the said portions of the chambers, said housings having perforate sections therein, and means for directing a current of air into the central portion through the screens and said openings and out of the perforate sections of the housings.

8. The combination with a hopper, of a housing below said hopper having a central air chamber receiving therefrom and having outer air chambers connected to said central chamber by lateral air passages, said outer chambers having perforate walls for the discharge of air, an inclined perforate plate extended across said central air chamber below both of the said lateral air passages, a receptacle receiving from the lower end of said inclined perforate plate, and a fan having an air discharge spout opening into the bottom of said central air chamber.

9. The combination with a hopper, of a housing below said hopper having a central air chamber receiving therefrom and having outer air chambers connected to said central chamber by lateral air passages, said outer chambers having perforate walls for the discharge of air, an inclined perforate plate extended across said central air chamber below both of the said lateral air passages, a receptacle receiving from the lower end of said inclined perforate plate, a fan having an air discharge spout opening into the bottom of said central air chamber, and an adjustable curved deflecting plate in the air discharge spout of said fan.

10. A grain separator having in combination a housing having screened openings in the upper portions of the sides thereof, partitions in said housing adjacent the sides thereof and having openings therethrough adjacent to said screen openings, oppositely inclined screens extending from and between said partitions, and means for forcing a current of air upwardly between said partitions through the said openings therein and out of said screen openings.

In testimony whereof I affix my signature in presence of two witnesses.

ADOLPH G. FEHRING.

Witnesses:
BERNICE G. BAUMANN,
HARRY D. KILGORE.